US008612807B2

(12) United States Patent
Collins, Jr.

(10) Patent No.: US 8,612,807 B2
(45) Date of Patent: Dec. 17, 2013

(54) ENTERTAINMENT KIOSK ERROR HANDLING AND TROUBLESHOOTING METHOD

(75) Inventor: Donald A. Collins, Jr., Buford, GA (US)

(73) Assignee: NCR Corporation, Duluth, GA (US)

( * ) Notice: Subject to any disclaimer, the term of this patent is extended or adjusted under 35 U.S.C. 154(b) by 402 days.

(21) Appl. No.: 13/005,047

(22) Filed: Jan. 12, 2011

(65) Prior Publication Data

US 2012/0179939 A1 Jul. 12, 2012

(51) Int. Cl.
*G06F 11/00* (2006.01)

(52) U.S. Cl.
USPC .......................................................... 714/57

(58) Field of Classification Search
None
See application file for complete search history.

(56) References Cited

U.S. PATENT DOCUMENTS 6,390,367 B1 5/2002 Doig
6,697,103 B1 * 2/2004 Fernandez et al. ............ 348/143
2006/0169769 A1 * 8/2006 Boyarsky et al. ............. 235/381
2010/0127013 A1 * 5/2010 Butler ................................ 221/1
2010/0325001 A1 * 12/2010 Barber et al. ................... 705/17
2012/0127307 A1 * 5/2012 Hassenzahl ................... 348/143

* cited by examiner

*Primary Examiner* — Michael Maskulinski
(74) *Attorney, Agent, or Firm* — Paul W. Martin; Peter H. Priest

(57) ABSTRACT

An entertainment kiosk error handling and troubleshooting method which facilitates correct of errors from a remote computer. An example method includes operating a camera for capturing images within the entertainment kiosk by a processor within the entertainment kiosk, detecting an error by the processor, associating recently captured images with the error, and sending an alert to a remote computer by the processor.

18 Claims, 6 Drawing Sheets

ENTERTAINMENT KIOSK ERROR HANDLING AND TROUBLESHOOTING METHOD

BACKGROUND

The compact disk (CD) and digital video disk (DVD) are leading portable digital media storage devices. Hundreds of millions of disks are produced each year. These disks are used to store digital media files including, but not limited to movies, television shows, music, music videos, video game software, productivity software and a wide array of additional file types and file formats. These disks are available in pre-recorded, recordable and rewritable formats.

Consumers may rent or purchase media disks from kiosks. These kiosks include a number of storage bays for storing the disks. Storage bays typically accommodate storage of the disks in protective disk cases. A robot within the kiosk captures a selected disk in a storage location and transports the disk to dispense and retrieve port in the kiosk. The robot also collects a returned disk from the dispense and retrieve port and transports the returned disk to a predetermined storage location.

When the robot fails and the failure cannot be remedied from a remote location, e.g., there should be a disk in the robot but there isn't, kiosk owners must typically schedule a service call. A technician visits the kiosk, determines the problem with the robot, and fixes the problem.

However, service calls are expensive. Therefore, it would be desirable to provide a method of handling errors and troubleshooting problems in entertainment kiosks which minimizes servicing costs.

SUMMARY

An entertainment kiosk error handling and troubleshooting method is provided.

An example method of handling errors in an entertainment kiosk includes operating a camera for capturing images within the entertainment kiosk by a processor within the entertainment kiosk, detecting an error by the processor, associating recently captured images with the error, and sending an alert to a remote computer by the processor.

An example troubleshooting method includes establishing a remote control connection with a processor within the entertainment kiosk via a network by a remote computer, operating the entertainment kiosk via the processor by the remote computer to display images within the entertainment kiosk captured by a camera and stored by the processor following detection of the error by the processor, wherein the images include information about operation of a delivery system for transporting storage devices containing entertainment media within the entertainment kiosk, operating the entertainment kiosk via the processor by the remote computer to display information about the error stored by the processor, and operating the entertainment kiosk via the processor by the remote computer to correct the error.

An example entertainment kiosk includes a camera for capturing images within the entertainment kiosk, and a processor for detecting an operating error in the entertainment kiosk, for associating recently captured images with the error, and for sending an alert to a remote computer.

DETAILED DESCRIPTION

Figure 1:
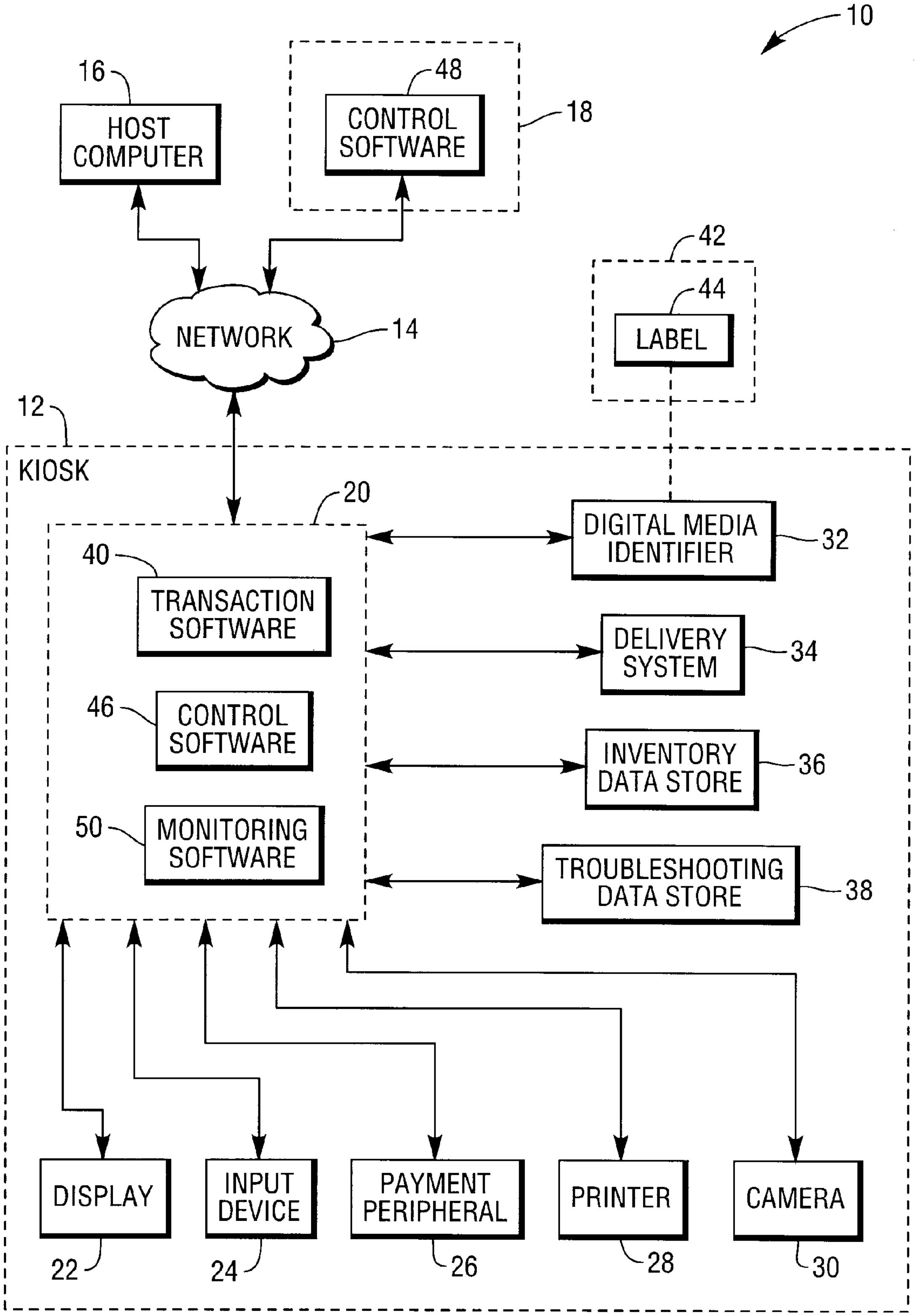
FIG. 1 is a block diagram of an example kiosk.

Referring now to FIG. 1, example media transaction system 10 primarily includes kiosk 12.

Kiosk 12 dispenses digital media in storage devices 42. Storage devices may be small, like Secure Digital (SD) cards and universal serial bus (USB) flash drives, or large, like compact disks (CDs) and digital video disks (DVDs).

Kiosk 12 may also electronically download digital media to kiosk or customer provided storage devices, which may include devices such as SD cards and USB flash drives, or storage devices incorporated into mobile phones and other mobile devices.

Kiosk 12 may include computer 20, display 22, input device 24, payment peripheral 26, printer 28, camera 30, digital media identifier 32, delivery system 34, and inventory data store 36, and troubleshooting data store 38.

Computer 20 includes a processor, memory, and program and data storage. Computer 20 may execute an operating system such as a Microsoft operating system, and a web browser for viewing web pages. Computer 20 further includes network circuitry for connecting to network 14, graphics circuitry for connecting to display 22, and other circuitry for connecting other peripherals, such as universal serial bus (USB) controller circuitry.

Computer 20 controls operation of kiosk 12. Computer 20 executes transaction software 40, which displays images of screens and records customer selections from those screens during a digital media transaction.

A digital media transaction may include rental, sale or license to use digital media. Digital media may include, but not be limited to, movies, television shows, music, music videos, video game software, productivity software and a wide array of additional file types and file formats. Storage devices 42 store digital media.

Transaction software 40 maintains a log of kiosk operation. The log may be stored in troubleshooting data store 38 to assist with troubleshooting of kiosk problems.

Computer 20 further executes control software 46 which facilitates control of kiosk 12 from remote computer 18. Control software 46 sends log and other information from troubleshooting data store 38 to remote computer 18.

Computer 20 may also execute additional software, such as monitoring software 50. Monitoring software 50 includes software for monitoring and controlling operation of kiosk components including detecting errors. Monitoring software 50 may be embodied in firmware or executable software or both. Monitoring software 50 may store log and other information in troubleshooting data store 38.

Monitoring software 50 may include camera software 96 (FIG. 4) and software for controlling camera 30. Camera software 96 causes camera 30 to capture images and displays camera images.

Figure 5:
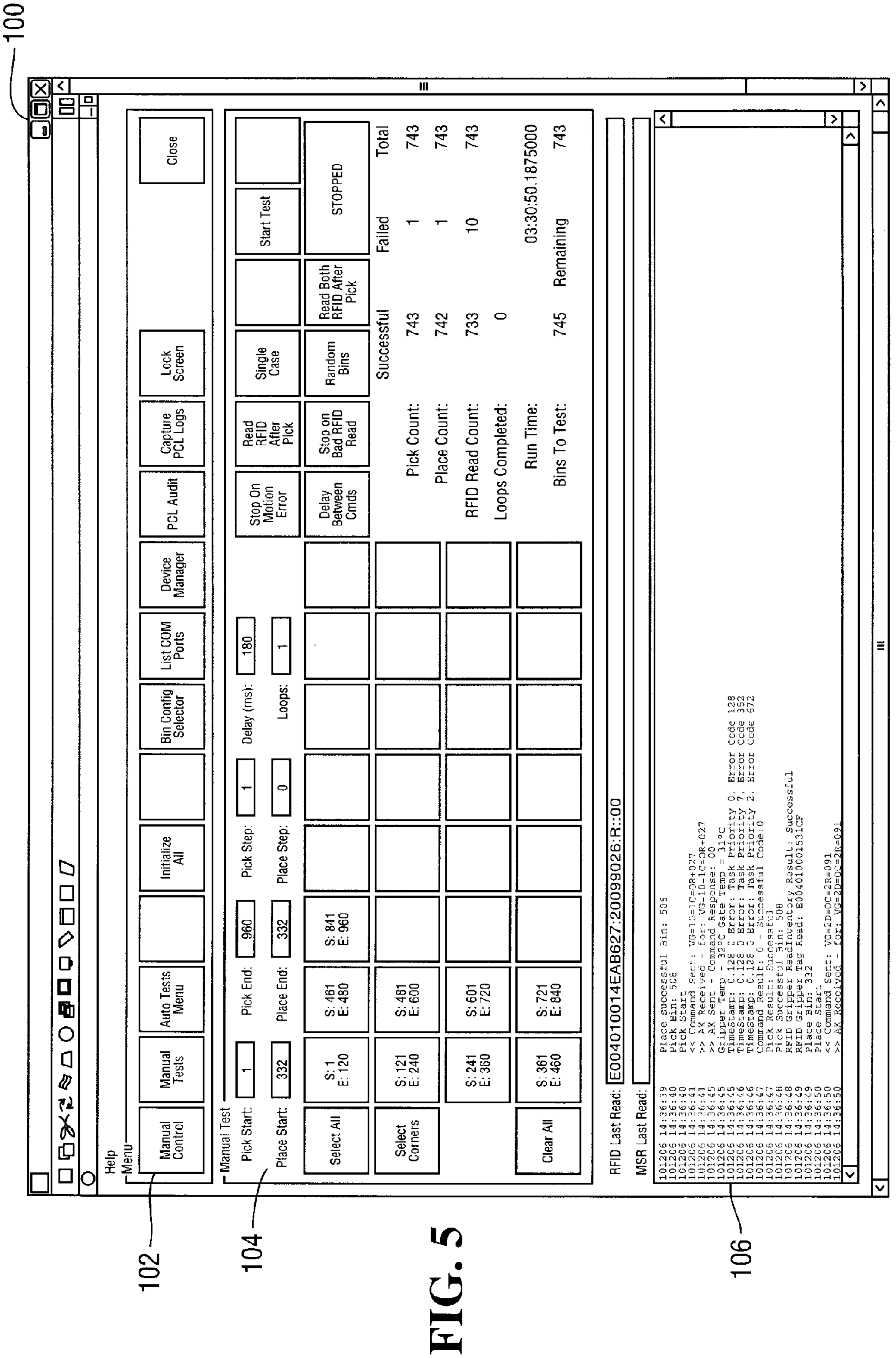
FIG. 5 is a view illustrating an example screen from motion control software.

Monitoring software 50 may also include motion control software 100 (FIG. 5). Motion control software 100 takes control of kiosk 12, including performing diagnostic tests to support troubleshooting. Monitoring software 50 may include other or additional software.

Display 22 displays the images of the transaction screens.

Input device 24 records operator selections during a digital media transaction. Input device 24 may include a touch sensitive device or a keyboard. Input device 24 and display 22 may be combined as a touch screen.

Payment peripheral 26 may include one or more of a card reader for reading credit, debit, and/or loyalty cards; a currency acceptor; a currency dispenser; a coin acceptor; and a coin dispenser.

Printer 28 includes a receipt printer, but may print additional information, such as coupons or other offers or promotions.

Camera 30 captures images of internal kiosk components to assist with troubleshooting of kiosk problems. The images may be stored in troubleshooting data store 38 and sent to remote computer 16. Camera 30 may include a web cam with USB connectivity.

Digital media identifier 32 identifies dispensed or returned digital media or both by reading labels 44 on digital media storage devices 42 or containers of storage devices 42, such as sleeves, jewel cases, or other types of cases.

For example, digital media identifier 32 may include a radio frequency identification (RFID) label reader and labels 44 may include RFID labels.

As another example, digital media identifier 32 may include a barcode reader and labels 44 may include barcodes.

Delivery system 34 delivers digital media to customers following selection and payment. For example, delivery system 34 may deliver digital media disks from storage locations 90 within kiosk 12 (FIG. 4) or may burn digital media onto blank disks and deliver a newly burned disk. As another example, delivery system 34 may electronically download digital media to suitable electronic storage devices, such as customer provided mobile devices. Delivery system 34 also captures and stores returned digital media to the storage locations within kiosk 12. Delivery system 34 may include an electro-mechanical robot as disclosed in commonly-assigned published U.S. application Ser. No. 10/866,387, publication number 2004/0254676, entitled "AUTOMATED BUSINESS SYSTEM AND METHOD OF VENDING AND RETURNING A CONSUMER PRODUCT". This published application is hereby incorporated by reference.

Inventory data store 36 contains an inventory of digital media within kiosk 12, either digital media storage devices 42 or digital media files or both. Transaction software 40 updates the inventory of digital media each time a digital media item is dispensed or received. Transaction software 40 may also send updated inventory information to a host computer via network 14. Host computer 16 may manage inventory in a plurality of kiosks 12.

Remote computer 18 executes control software 48 for remotely controlling operation of kiosk 12. During troubleshooting, control software 48 connects to control software 46 over network 14 and uploads images and log information from troubleshooting data store 38. Control software 48 can also upload live image data from camera 30. Control software 48 allows a remote troubleshooter to send commands to kiosk 12 in an attempt to resolve kiosk problems.

In an alternative embodiment, the functions of host computer 16 and remote computer 18 may be combined.

Control software 46 and 48 may include any suitable remote control software, also known as remote desktop control software. In an example embodiment, control software 46 and 48 include server and client remote control software, respectively, from UltraVNC.

Control software 46 may run continuously as a service. Control software 48 may run only when troubleshooting is necessary.

For example, if a storage device 42 is jammed in delivery system 34, control software 48 uploads images illustrating the jam and the log from kiosk 12 and displays the images and log to a remote troubleshooter. Under remote troubleshooter control, control software 48 sends commands to kiosk 12 to reposition delivery system 34 in order to clear the jam.

Troubleshooting data store 38 may include a buffer area or designated storage folder or directory of a hard disk drive, a random access memory (RAM) buffer, or other storage location.

Network 14 may include a cellular communication network, a global communications network also known as the Internet, a wired or wireless network, or any combination of such networks.

Figure 2:
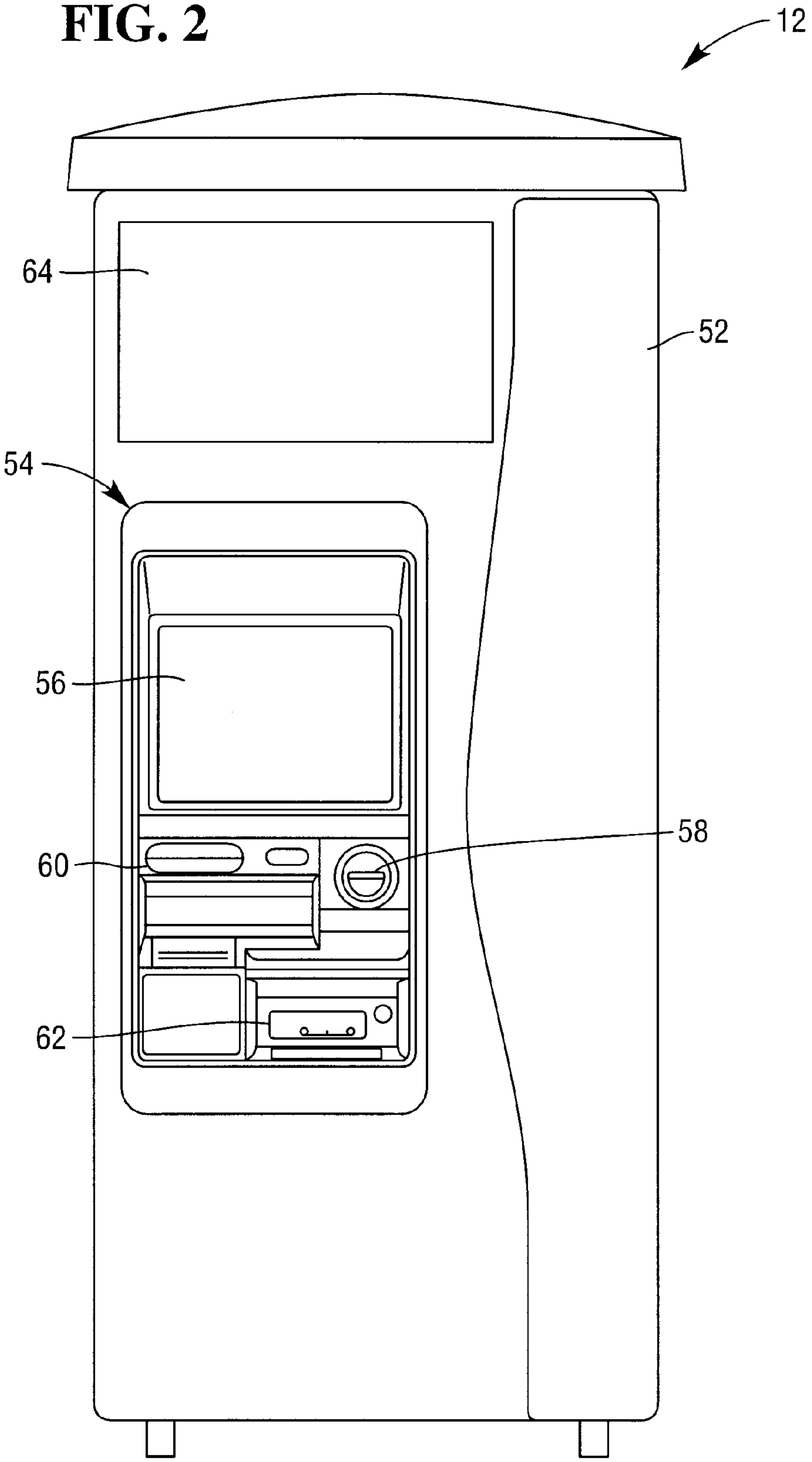
FIG. 2 is a view illustrating an example kiosk.

Referring to FIG. 2, an example kiosk 12 is illustrated.

Example kiosk 12 includes housing 52 for storing digital media in cases. Kiosk 12 further includes user interface portion 54, which includes touch screen 56, card reader 58, printer 60, and dispense and retrieve port 62.

Kiosk 12 may further include auxiliary display 64. Auxiliary display 64 displays movie trailers, promotions, and other information under the control of transaction software 42.

Dispense and retrieve port 62 includes a slot from which digital media in cases are dispensed and into which empty cases may be inserted. Digital media identifier 32 may be located in dispense and retrieve port 62 or on transport system 32.

Figure 3:
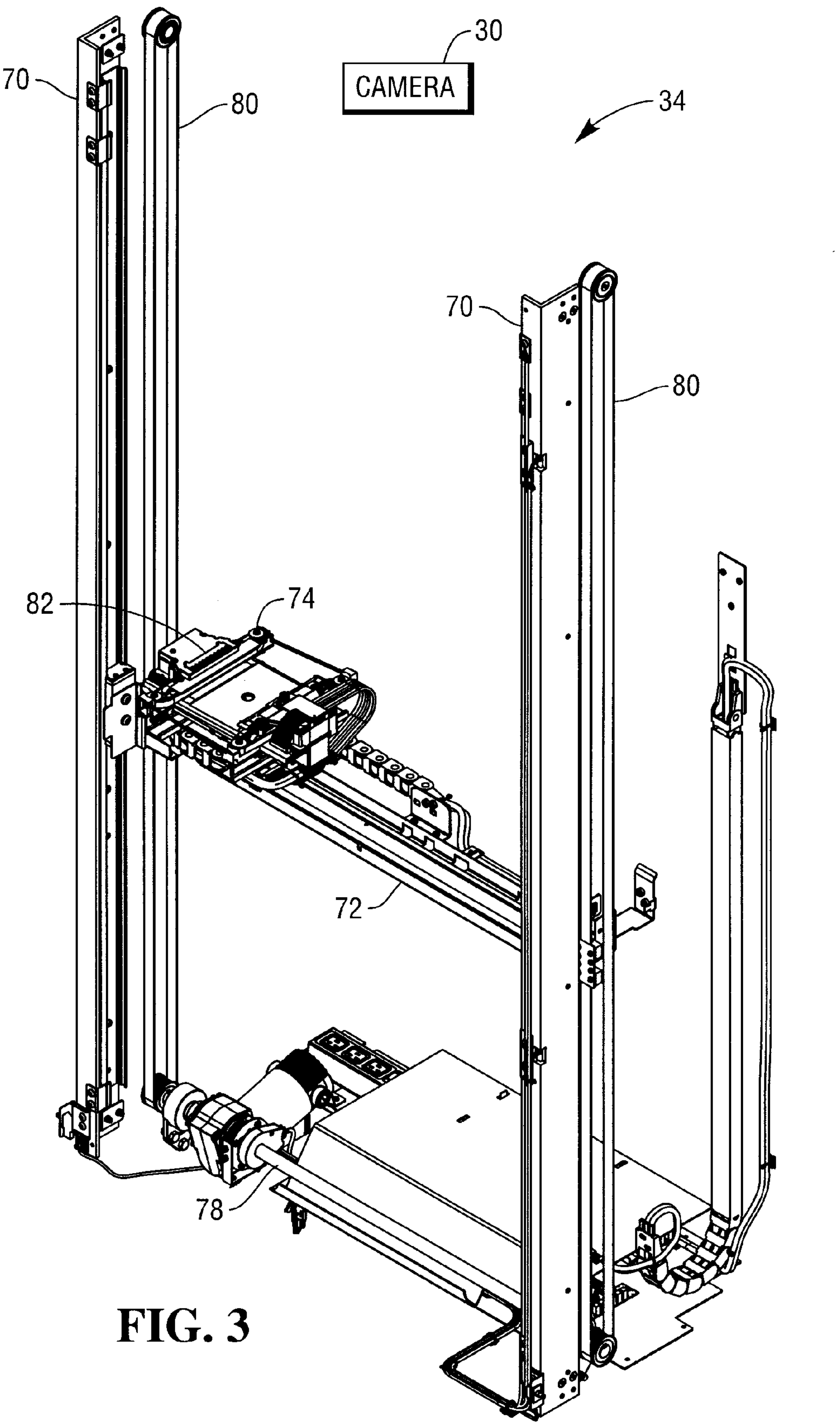
FIG. 3 is a view illustrating an example digital media delivery system inside the example kiosk.

With reference to FIG. 3, an example delivery system 34 may be capable of movement along three different dimensions, vertical, horizontal and forwards/backwards.

Delivery system 34 includes a pair of vertical guide rails 70. Vertical guide rails 70 are laterally spaced apart generally along the length of housing 52. Each vertical guide rail 70 supports a conveyor 80, which may include a belt, chain, cable, or other suitable conveyor.

Drive assembly 78 includes a stepper or servo motor and drive shaft coupled to conveyors 80 via sprockets or other suitable couplings. Drive assembly 78 facilitates a common rotation of conveyors 80.

Coupled between conveyors 80 is a horizontal rail 72, which is driven up and down by drive assembly 78.

On top of horizontal carriage 72 is gripper assembly 74, which moves along horizontal carriage 72 and perpendicular to horizontal rail 72. Gripper assembly 74 interacts with port 62 to transport digital media such as CDs or DVDs in cases from storage locations within housing 52 to port 62 and to transport returned CDs or DVDs in cases from port 62 to storage locations within housing 52.

Gripper assembly 74 further includes sensors for determining positions of gripper assembly 74 on horizontal carriage 72 and diagnostic lights 82. Example diagnostic lights and their meanings are illustrated in Table I:

TABLE I

| | |
|---|---|
| Front TBS | Front Through Beam Sensor—LED is illuminated when a CD or DVD is detected at the front of gripper assembly 74 |
| Front LD | Front Look Down Sensor—LED is illuminated when no CD or DVD is present on the front half of the gripper assembly 74 |

TABLE I-continued

| | |
|---|---|
| Spare F | LED behaves the same as the Front LD |
| Z Side | LED is illuminated when gripper assembly 74 is in the front half of housing 52 |
| Z Limit | LED is illuminated when gripper assembly 74 is positioned within operational limits |
| X Home | LED is illuminated when gripper assembly 74 is positioned over a position sensor |
| X Limit | LED is illuminated when gripper assembly 74 is moved along horizontal carriage 72 beyond operational limits |
| Spare R | LED behaves the same as the Rear LD |
| Rear LD | Rear Look Down Sensor—LED is illuminated when no disk is present on the rear half of gripper assembly 74 |
| Rear TBS | Rear Through Bean Sensor—LED is illuminated when a CD or DVD is detected at the rear of gripper assembly 74 |

Other position sensors and diagnostic lights are also envisioned. The other diagnostic lights may be located in the bottom of housing 52 and reveal current operating information about computer 20, drive assembly 78, and other kiosk components.

In the example embodiment, camera 30 is located at the top of housing 52 and looks down. From this vantage point, camera 30 can capture images of illustrating operation of horizontal carriage 72 and gripper assembly 74. The images may capture activated diagnostic lights 82 on gripper assembly 74 and activated diagnostic lights elsewhere within housing 52.

Figure 4:
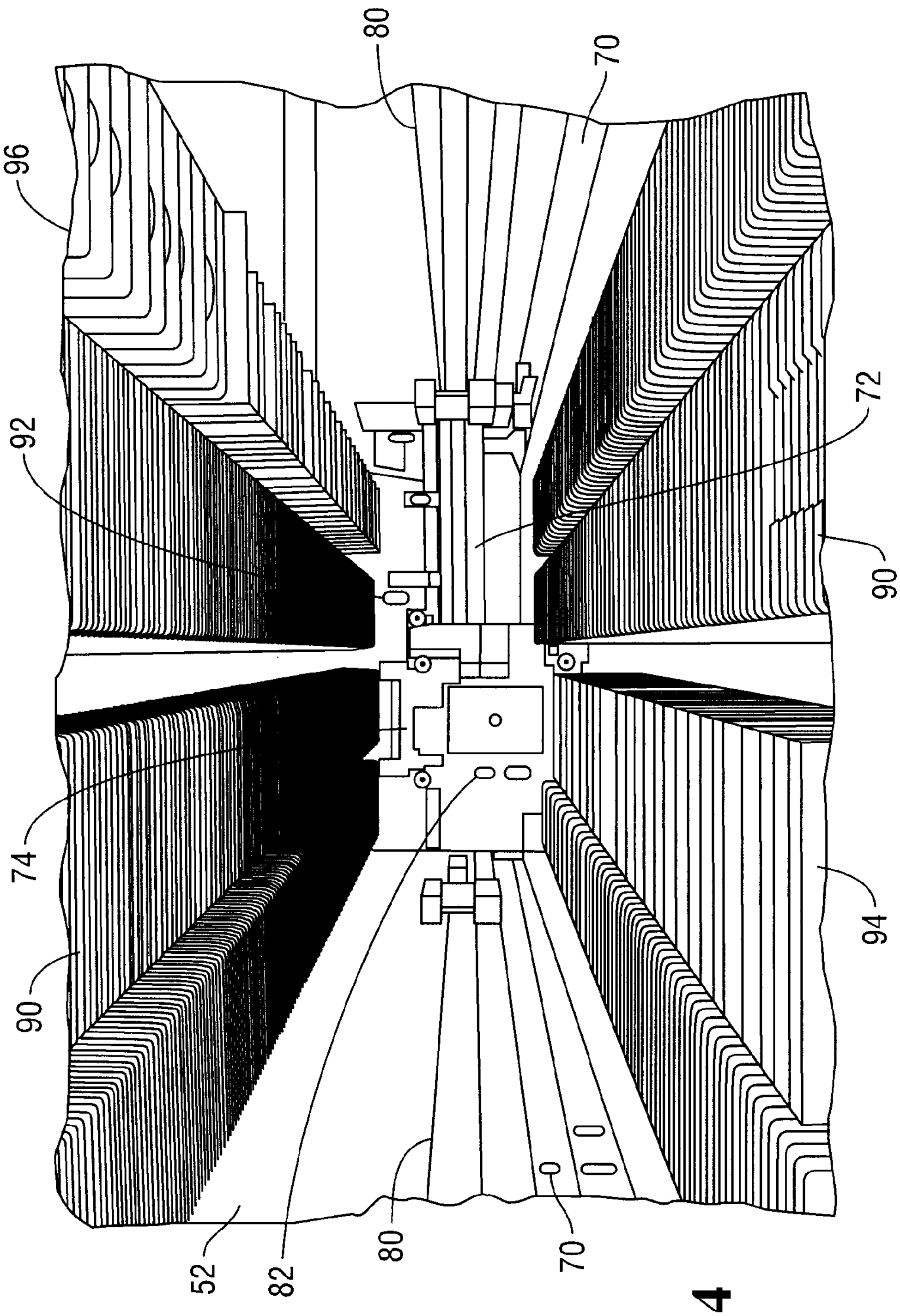
FIG. 4 is a view illustrating an example screen from camera software.

Referring now to FIG. 4, an example screen from camera software 96 included within monitoring software 50 and executed by computer 20 is shown. Camera 30 and camera software 96 may be Logitech products.

A remote troubleshooter would see rails 70, belts 80, and other components within housing 52 during normal operation and during failures. For example, the troubleshooter would be able to view horizontal carriage 74 and would see that horizontal carriage 74 is located at a low position in housing 52 in FIG. 4. In addition, the troubleshooter would see lights 82 on gripper assembly 74 and additional light 92 on another light panel at the bottom of housing 52 and be able to glean operating status information from the lights.

Also illustrated are example storage locations 90 and 92 on front and rear sides of housing 52. Some storage locations 90 include storage cases 94 containing digital media storage devices 42, such as CDs and DVDs.

Referring now to FIG. 5, an example screen from a motion control program 100 included within monitoring software 50 is illustrated.

A remote troubleshooter may execute motion control program 100 to take control over the operation of horizontal carriage 72 and gripper assembly 74, perform tests, capture operational information, and rectify motion related problems, such as jams caused by improperly placed storage cases 94.

For example, a troubleshooter may use motion control program 100 to retrieve a storage case 94 from one storage location 90 and move it to another storage location 90 or to dispense and retrieve port 62 or vice versa.

Motion control program 100 includes a menu portion 102 for selecting different control options, such as manual control, manual tests, and automatic tests.

Another portion 104 contains selections and information related to the choice of control option in menu portion 102. Illustrated are selections and information related to the manual test control option.

Another portion 106 contains a running event log identifying successful and unsuccessful operations.

Figure 6:
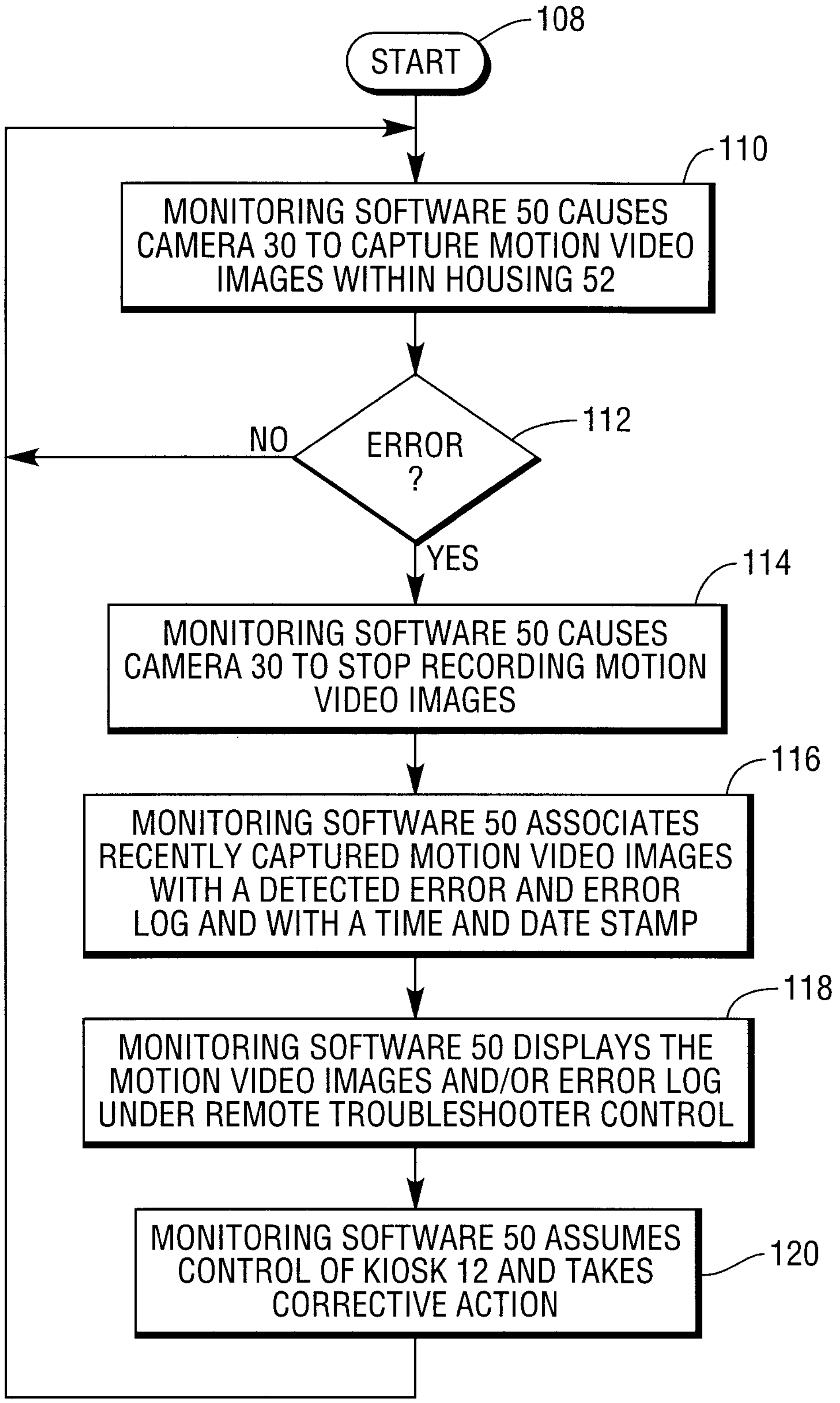
FIG. 6 is a flow diagram illustrating an example troubleshooting method.

Referring now to FIG. 6, an example error handling method is illustrated beginning with start 108.

In step 110, monitoring software 50 causes camera 30 to capture motion video images within housing 52, with an example emphasis on capturing motion video images illustrating operation of horizontal carriage 72 and gripper assembly 74. Monitoring software 50 stores the motion video images in troubleshooting data store 38. Monitoring software 50 may additionally track storage locations of different captured sequences of motion video images.

Monitoring software 50 causes camera 30 to capture motion video images continuously or intermittently, for example, according to a predetermined schedule.

Monitoring software 50 may overwrite previously stored motion video images with newer images after a predetermined time or according to a predetermined schedule.

In step 112, monitoring software 50 continues to monitor in this way until it detects an error. If it detects an error, operation continues to step 114.

In step 114, monitoring software 50 causes camera 30 to stop recording motion video images. Monitoring software 50 may alternatively cause camera 30 to continue recording motion video images for a predetermined time after the error has been detected.

In step 116, monitoring software 50 associates recently captured motion video images with the detected error and error log and with a time and date stamp.

A remote troubleshooter is alerted to the error. Monitoring software 50 may send an alert message over network 14. Alternatively, an alert may be received via phone call, email, text message, or other communication from an owner or other person responsible for kiosk 12.

Following receipt of an alert, a remote troubleshooter executes control software 48 at remote computer 18 to connect with computer 20 via control software 46. The remote troubleshooter identifies the record of the error that led to the alert, including motion video images and the error log associated with the error.

In step 118, monitoring software 50 displays the motion video images and the error log, as necessary, under remote troubleshooter control. From the error log information and/or the replay of the motion video images, including captured statuses of diagnostic lights such as lights 82, the remote troubleshooter can try to correct the error.

In step 120, monitoring software 50 assumes control of kiosk 12 and takes corrective action.

For example, the remote troubleshooter may use motion control software 100 to assume control and monitor movement of horizontal carriage 72 and/or gripper assembly 74 to correct a jam error. The remote troubleshooter may also watch corrective movements in substantially real time using camera software 96.

Other examples are also envisioned, including remotely rebooting computer 20, remotely updating software, remotely updating firmware, and remotely changing configuration settings.

Following correction of the error, operation returns to step 110 to continue monitoring. If an error cannot be corrected remotely, for example, a broken belt 80, then the remote troubleshooter may dispatch a technician to fix the error.

Advantageously, the error handling method provides detailed and timely information to enable a remote troubleshooter to fix many errors remotely, errors that would have otherwise required a service technician to go onsite to the location of kiosk 12. Further, the error handling method provides important diagnostic information to a technician when an error can only be fixed onsite, providing further cost savings.

Although particular reference has been made to certain embodiments, variations and modifications are also envisioned within the spirit and scope of the following claims.

The invention claimed is:

1. A method of handling errors in an entertainment kiosk comprising:
   - operating a camera for capturing images within the entertainment kiosk by a processor within the entertainment kiosk;
   - detecting an error by the processor;
   - associating recently captured images with the error;
   - storing captured images; and
   - sending an alert to a remote computer by the processor.

2. The method of claim 1, further comprising storing a log file containing information about the error by the processor.

3. The method of claim 1, wherein the camera is aimed in a generally downward looking direction.

4. The method of claim 1, wherein operating step comprises capturing images of moving parts within the entertainment kiosk.

5. The method of claim 4, wherein the moving parts comprise a robot.

6. The method of claim 1, wherein the error comprises a disk jammed in a disk delivery system within the entertainment kiosk.

7. The method of claim 1, further comprising:
   - ceasing capturing of images by the processor; and
   - continuing capturing of images by the processor following correction of the error.

8. The method of claim 7, further comprising overwriting the previously captured images with later captured images.

9. A method of handling errors in an entertainment kiosk comprising:
   - operating a camera for capturing images within the entertainment kiosk by a processor within the entertainment kiosk;
   - detecting an error by the processor;
   - associating recently captured images with the error; and
   - sending an alert to a remote computer by the processor, wherein operating step comprises capturing images of diagnostic lights within the entertainment kiosk.

10. A method of handling errors in an entertainment kiosk comprising:
   - operating a camera for capturing images within the entertainment kiosk by a processor within the entertainment kiosk;
   - detecting an error by the processor;
   - associating recently captured images with the error;
   - sending an alert to a remote computer by the processor;
   - storing a log file containing information about the error by the processor; and
   - accepting connection of a remote computer to the entertainment kiosk via a network for allowing a remote troubleshooter using the remote computer to view the previously captured images and the log file.

11. An entertainment kiosk comprising:
   - a camera for capturing images within the entertainment kiosk;
   - a processor for detecting an operating error in the entertainment kiosk, for associating recently captured images with the error, and for sending an alert to a remote computer; and
   - a troubleshooting data store, wherein the processor is also for storing the images in the troubleshooting data store.

12. The kiosk of claim 11, wherein the processor is also for ceasing capturing of images, and continuing capturing of images following correction of the error.

13. The kiosk of claim 12, wherein the processor is also for overwriting the previously captured images with later captured images.

14. The kiosk of claim 11, wherein the processor is also for creating a log file containing information about the error and for storing the log file in the troubleshooting data store.

15. The kiosk of claim 11, further comprising a disk delivery system, wherein the images include the disk delivery system.

16. The kiosk of claim 11, wherein the processor is also for accepting connection of a remote computer to the entertainment kiosk via a network for allowing a remote troubleshooter using the remote computer to view the previously captured images and the log file.

17. A method of troubleshooting an error in an entertainment kiosk comprising:
   - establishing a remote control connection with a processor within the entertainment kiosk via a network by a remote computer;
   - operating the entertainment kiosk via the processor by the remote computer to display images within the entertainment kiosk captured by a camera and stored by the processor following detection of the error by the processor;
   - wherein the images include information about operation of a delivery system for transporting storage devices containing entertainment media within the entertainment kiosk;
   - operating the entertainment kiosk via the processor by the remote computer to display information about the error stored by the processor; and
   - operating the entertainment kiosk via the processor by the remote computer to correct the error.

18. The method of claim 17, wherein error results in stoppage of the delivery system and the method further comprises restarting the delivery system following correction of the error.

* * * * *